Sept. 16, 1969      R. L. DOYLE ET AL      3,467,301
VEHICLE MOUNTED BLOWER ASSEMBLY WITH HOSE AND SUPPORT BRACKET
Filed April 1, 1968      2 Sheets-Sheet 1
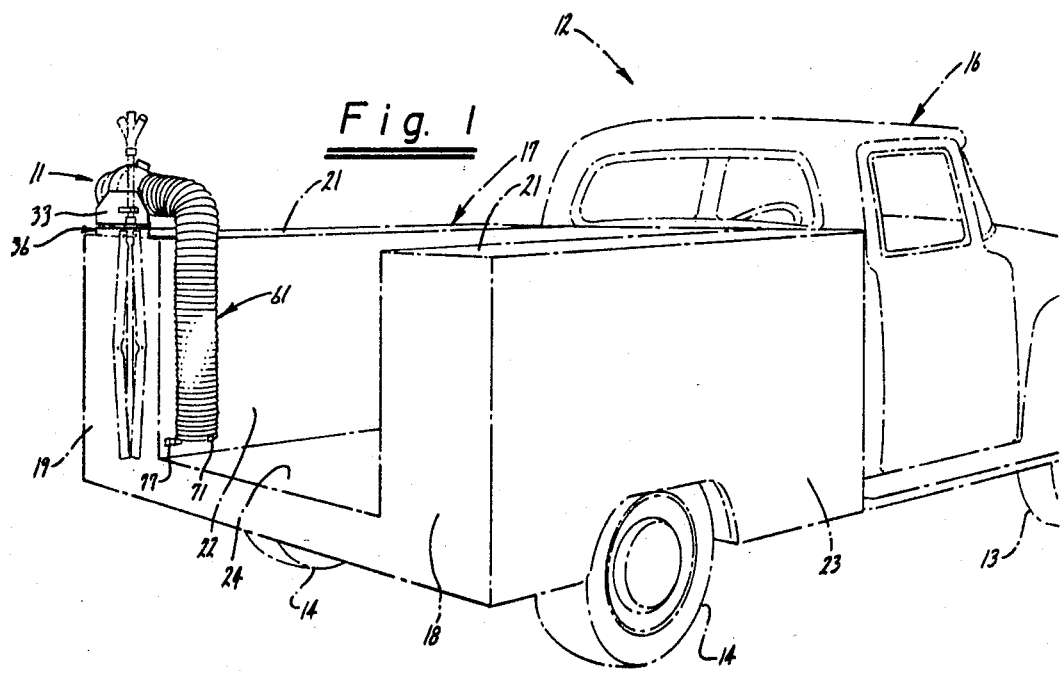
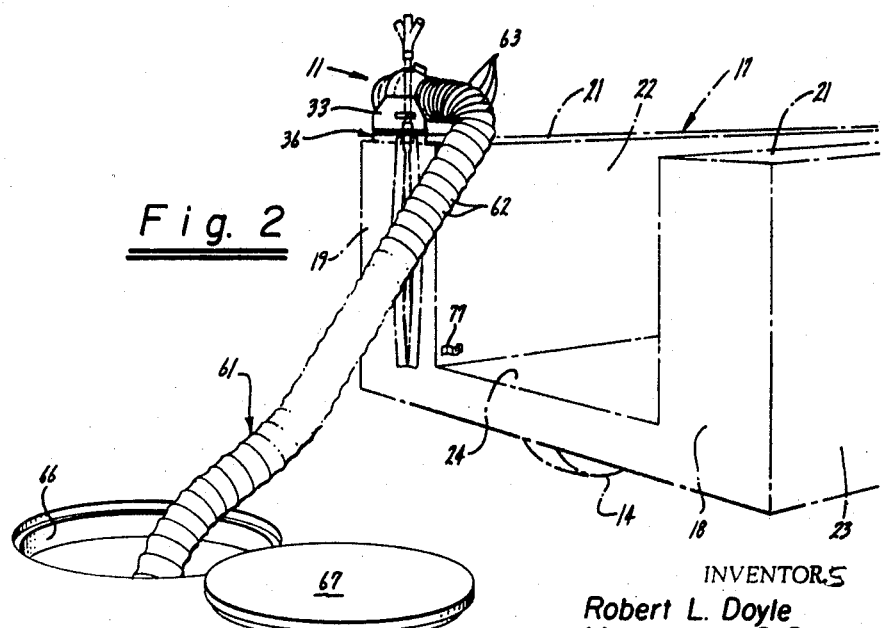
INVENTORS
Robert L. Doyle
Montgomery C. Swezy
Flehr, Hohbach, Test
Albritton & Herbert
Attorneys Sept. 16, 1969  R. L. DOYLE ET AL  3,467,301
VEHICLE MOUNTED BLOWER ASSEMBLY WITH HOSE AND SUPPORT BRACKET
Filed April 1, 1968  2 Sheets-Sheet 2
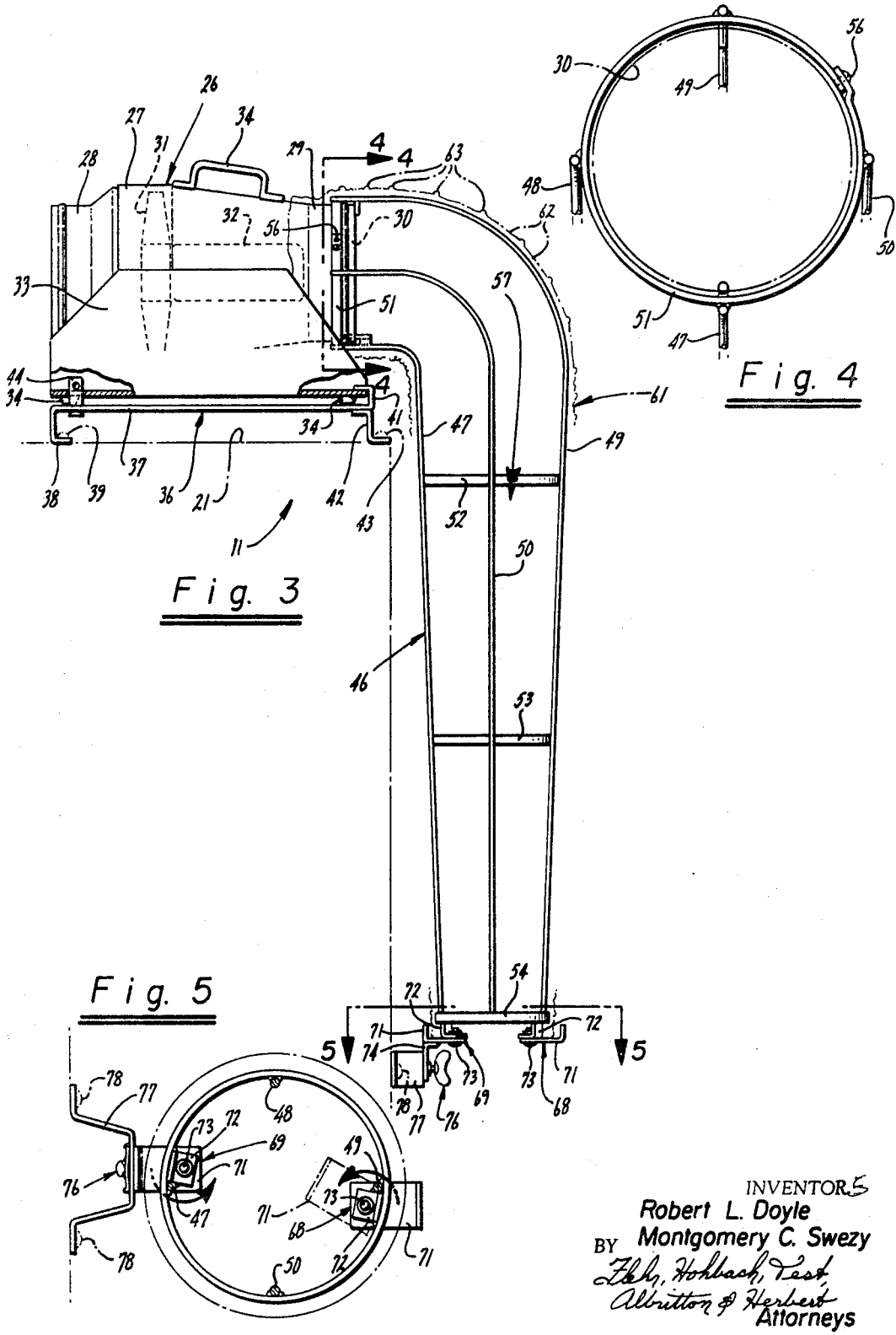
INVENTORS
Robert L. Doyle
BY Montgomery C. Swezy
Attorneys

United States Patent Office 3,467,301
Patented Sept. 16, 1969

3,467,301
VEHICLE MOUNTED BLOWER ASSEMBLY WITH HOSE AND SUPPORT BRACKET
Robert L. Doyle and Montgomery C. Swezy, Palo Alto, Calif., assignors to Western Progress, Inc., Mountain View, Calif.
Filed Apr. 1, 1968, Ser. No. 717,495
Int. Cl. F04b 39/00; B60p 3/30
U.S. Cl. 230—235          7 Claims

ABSTRACT OF THE DISCLOSURE

Vehicle mounted blower assembly for manholes having a hose adapted to be inserted into the manhole and a bracket for supporting the hose in use and in storage positions.

Background of the invention

Blowers have heretofore been provided for the ventilation of manholes. However, heretofore, such blowers have been transported to the site on vehicles and then placed in a position alongside the manhole to ventilate the manhole. There is a need for a blower assembly of the type which can be mounted upon a vehicle and which can remain upon the vehicle when it is in use for ventilating the manhole. There is also a need for facilities on the vehicle for storing the hose utilized for ventilating the manhole when it is not in use.

Summary of the invention and objects

The vehicle mounted blower assembly with hose and support bracket consists of a blower assembly which includes a housing and has an outlet through which the air passes. A hose bracket is mounted on the housing for swivel movement on the housing. The bracket is formed of relatively rigid material and is generally L-shaped. The bracket has a substantially open passageway extending from the outlet in the housing to the other end of the bracket. The bracket has a passage which gradually decreases in cross-section in a direction towards the opening remote from the opening in the housing. A flexible collapsible hose is mounted on the bracket and is secured about the outlet opening in the housing. The other end of the hose is slidably mounted on said bracket and is adapted to be removed from the bracket and inserted into a manhole. The bracket is provided with retaining means for holding the hose in place on the bracket when it is not in use.

In general, it is an object of the present invention to provide a blower assembly with a hose and support bracket which is particularly adapted to be mounted on a vehicle and which can be utilized while it is on the vehicle.

Another object of the invention is to provide a blower assembly with hose and support bracket of the above character which can be readily placed into use.

Another object of the invention is to provide a blower assembly, hose and bracket of the above character which is relatively simple.

Additional objects and features of the invention will appear from the following description in which the preferred embodiment is set forth in detail in conjunction with the accompanying drawing.

Brief description of the drawing

FIGURE 1 is a perspective view of a blower assembly which includes a hose and a hose support bracket mounted upon a self-propelled vehicle which is shown in broken lines in which the hose is in a storage position.

FIGURE 2 is a perspective view showing the blower assembly shown in FIGURE 1 being used for ventilating a manhole.

FIGURE 3 is a side elevational view, partly in cross-section, of the blower assembly as shown in FIGURES 1 and 2 and showing the hose in broken lines.

FIGURE 4 is a cross-sectional view taken along the line 4—4 of FIGURE 3.

FIGURE 5 is a cross-sectional view taken along the line 5—5 of FIGURE 3.

Description of the preferred embodiment

The blower assembly 11 is mounted upon a self-propelled vehicle 12 of a conventional type; alternatively a trailer can be utilized. As shown therein, the vehicle 12 is provided with a chassis which includes front and rear wheels 13 and 14. It also includes a cab 16 mounted over the front wheels 13 and a cabinet-like body 17 extending to the rear and mounted over the rear wheels. The body 17 is provided with two spaced vertical upstanding sections 18 and 19, each of which is provided with a relatively planar top wall 21, and inner and outer vertical side walls 22 and 23. The body 17 also includes a horizontal platform 24 between the two sections 18 and 19 which is open to the rear.

As shown in the drawing, the blower assembly 11 is mounted upon one of the sections 18 or 19 and, as shown in FIGURE 1, is mounted on the left-hand section 19 on the top wall 21 adjacent the rear end of the top wall. The blower assembly 11 includes a blower 26 which is of a type described in copending application Ser. No. 580,246, filed Sept. 19, 1966, now Patent No. 3,401,869. As disclosed therein, the blower includes a venturi-shaped housing 27 that has a generally cylindrical inlet portion 28 and a generally cylindrical outlet portion 29 which forms an outlet 30. A blower 31 is mounted within the housing and is driven by a motor 32 within the housing so that the fan causes the air to be drawn into the inlet portion and discharged from the outlet 30 of the housing 27. The motor 32 is connected by a cord (not shown) to an electrical outlet (not shown) provided on the vehicle and connected to the battery supply in the vehicle or to an auxiliary generator or battery on the vehicle. The housing 27 is mounted in a U-shaped stand 33 and is also provided with a handle 34 to facilitate carrying of the blower assembly. The stand 33 is provided with resilient rubber feet 34.

The blower assembly 26 is mounted upon the vehicle 12 in a suitable manner. For example, as shown in the drawings, a stand or bracket 36 can be provided. This stand 36 consists of a member 37 which is provided with a U-shaped portion 38 at one end which is secured to the vehicle 38 by suitable means such as rivets 39. The member 37 is also provided with a U-shaped portion 41 at its other end which faces in an opposite direction from the U-shaped portion 38 and is provided on the opposite side of the member 37 so that it is positioned above the top surface 21 of the section 19 of the body 17. The other end of the member 37 is secured to the top wall 21 by a generally Z-shaped member 42 which has one end secured to the body by suitable means such as rivets 43 and has the other end secured to the member 37 by suitable means such as welding.

As can be seen, the stand 33 of the blower assembly 26 is open at both ends and this permits one end of the bottom wall of the stand 37 to be inserted underneath one portion of the U-shaped portion 41 of the member 37 to hold it in place. The other end of the stand 33 is secured to the stand 36 by suitable means such as a quick-release fastener 44 of a conventional type. With this construction it can be seen that the blower assembly 26 can be readily inserted on the stand 36 and also can be readily removed from the stand 36.

A hose support bracket 46 is mounted upon the blower assembly 26. The hose support bracket 46 is generally L-shaped as shown particularly in FIGURE 3 and consists of four elongate members in the form of rods 47, 48, 49 and 50 which generally have an L-shaped form and which are arranged approximately 90° apart to generally circumscribe a circle in cross-section but one which gradually decreases in diameter from one end of the bracket to the other. A plurality of rings 51, 52, 53 and 54 are provided which are spaced longitudinally of the rods 47, 48, 49 and 50 and serve as spacers for the rods. As can be seen, the spacer ring 51 is provided at the large end, whereas the rings 52 and 53 are disposed between the large and small ends. The ring 54 is provided at the small end of the hose support bracket.

The ring 51 is split to permit its placement over the outlet end portion 29 of the blower assembly and to permit the same to be fastened thereon by suitable means such as a screw 56 to permit swivel or pivotal movement of the hose support bracket 46 upon the housing of the blower assembly. As can be seen, the hose support bracket is provided with a passage 57 which extends from the outlet of the blower assembly longitudinally of the hose support bracket out through the small ring 54 provided at the other end of the hose support bracket. The passage 57 gradually decreases in size from the inlet to the outlet.

A hose 61 of a generally conventional construction is mounted upon the hose support bracket. The hose 61 is formed of a flexible, relatively impervious material 62 and is provided with a plurality of relatively rigid rings 63 spaced longitudinally of the hose and incorporated into the material 62 forming the hose by suitable means such as sewing so as to generally retain the cylindrical shape desired for the hose. The rings 63 have a diameter which is only slightly greater than the largest cross-sectional dimension of the hose support bracket 46 so that it is adapted to be slid over the hose support bracket and then over the outlet portion of the housing of the blower assembly and fastened thereto by suitable means such as a strap which clamps one end of the hose about the outlet portion of the housing. As shown in FIGURE 2, the hose 61 is constructed so that it has a length which is sufficient to reach down into a manhole 66 as shown in FIGURE 2 from which the manhole cover 67 has been removed. The hose 61 is of a type which can be collapsed and, therefore, can be pushed onto the hose support bracket 46 and stored completely on the hose support bracket as shown in FIGURE 1.

Means is provided on the hose support bracket for retaining the hose in a stored position on the bracket and consists of a pair of clamps 68 and 69 which are mounted upon the lower extremity of the hose support bracket 46. The clamp 68 consists of an L-shaped member 71 which is pivotally connected to another L-shaped member 72 by a bolt 73. The member 72 is secured to the ring 54 by suitable means such as welding. The other clamp 69 also includes L-shaped members 71 and 72 which are pivotally interconnected by a bolt 73. In addition, the L-shaped member 71 of the clamp 69 has another L-shaped member 74 secured thereto by suitable means such as welding and which is provided with a quick-release fastener 76 of a conventional type which is adapted to secure the bracket 69 to a bracket-like member 77 secured to the side wall 22 of the section 19 by suitable means such as rivets 78.

Operation and use of the blower assembly with the hose support bracket and hose may now be briefly described as follows. Let it be assumed that the blower assembly hose support bracket and the hose are in a position shown in FIGURE 1 in which the hose is in a stored position. Also, let it be assumed that the self-propelled vehicle 12 is driven to a location and it is desired to ventilate a manhole 66. To remove the hose from the bracket, it is merely necessary to lift the hose by one hand so that it clears the clamps 68 and 69 and then the quick-release fastener 76 is operated to release it from the member 77. Thereafter, the L-shaped members 71 of both the clamps 68 and 69 are pivoted inwardly as shown in FIGURE 5 so that they do not extend beyond the outer margins of the lower ring 54. After this has been accomplished, the support bracket is swivelled slightly by pulling the lower end of the hose support bracket rearwardly so that as the hose is permitted to drop off of the bracket, it will clear the platform 24. As the hose drops off the bracket, it extends and can be lowered into the manhole. As soon as this has been accomplished, the blower motor 32 can be energized to place the blower in operation. The blower can operate in either of two ways: it can either draw fresh air and force it down into the manhole, or it can suck air out of the manhole depending upon the direction of rotation of the motor for the blower. Since the bracket 46 is open between the rods 47, 48, 49 and 50, the bracket 46 does not interfere in any substantial way with the movement of air through the hose 61.

It can be seen that with this arrangement a manhole can be quickly and readily ventilated merely by backing the truck up to the manhole and then quickly releasing the hose and lowering it into the manhole. After the work in the manhole has been completed and it is no longer desired to ventilate the same, the hose can be removed from the manhole and collapsed and pushed upwardly onto the hose support bracket 46 until the lower extremity of the hose clears the lower extremity of the hose support bracket. Thereafter, the L-shaped members 71 are rotated outwardly. At the same time, the hose support bracket can be swivelled inwardly and the quick-release fastener 76 secured in place so that the hose support bracket is firmly supported and at the same time the hose is retained upon the hose support bracket.

It can be seen that during all times the hose 61 is supported by the support bracket, whether it is in use or during the time it is in storage. This is particularly true with respect to the right-angle bend which is formed by the hose. This right-angle bend is always supported by the hose support bracket to prevent the collapse of the hose.

It also can be seen that the hose is mounted in such a manner that it is protected within the body of the self-propelled vehicle. It also can be seen that, if desired, the blower assembly 26 can be readily removed from the vehicle and used on the ground.

It is apparent from the foregoing that there has been provided a blower assembly with a hose support bracket and hose which has many advantageous features and which is particularly adapted for mounting on a vehicle so that it can readily be put into use and can be taken out of use.

We claim:

1. In an assembly of the character described, a blower assembly including a housing and having an outlet through which air passes, a hose bracket mounted on said housing and means for swivel movement of said hose bracket on said housing, said bracket being formed of relatively rigid material and being generally L-shaped, said bracket having a substantially open passageway extending from the outlet in the housing longitudinally through the hose support bracket, said hose support bracket having a gradually decreasing lateral cross-section extending longitudinally of the hose support bracket from the end connected to the housing to the outlet end, a flexible collapsible hose mounted on said hose support bracket and secured to the outlet end of the housing, the other end of the hose being slidably mounted on the support bracket and being removable therefrom so that the hose can be extended.

2. An assembly as in claim 1 together with a vehicle, and means for removably mounting said blower assembly on said vehicle with said hose support bracket and said hose mounted thereon.

3. An assembly as in claim 1 together with means mounted on said hose support bracket for retaining said hose thereon, said retaining means being movable to a position to permit the end of the hose adjacent thereto to be removed therefrom.

4. An assembly as in claim 1 wherein said hose support bracket includes a plurality of relatively rigid elongate members extending longitudinally of the hose support bracket and a plurality of spacer members secured to said elongate members and being spaced longitudinally of the elongate members.

5. An assembly as in claim 2 together with means for securing said hose support bracket to said vehicle.

6. An assembly as in claim 4 wherein there are at least four of said elongate members and wherein said four members are spaced substantially 90° apart.

7. An assembly as in claim 4 wherein one of said spacer members is split to permit the same to be fastened over the outlet end of the housing and means for removably securing said spacer to said housing to permit pivotal movement of the bracket.

References Cited
UNITED STATES PATENTS

| | | | |
|---|---|---|---|
| 999,880 | 8/1911 | Schaeffer | 230—235 |
| 1,553,095 | 9/1925 | Moore | 230—235 |
| 2,609,231 | 9/1952 | Crawford | 137—355.12 |
| 3,096,933 | 7/1963 | Bora | 230—235 |

HENRY F. RADUAZO, Primary Examiner

U.S. Cl. X.R.

137—344, 355.16; 230—120, 132